(12) United States Patent
Saito et al.

(10) Patent No.: US 6,408,976 B1
(45) Date of Patent: *Jun. 25, 2002

(54) TIE ROD MOUNTING STRUCTURE IN CENTER TAKE-OFF TYPE POWER STEERING APPARATUS

(75) Inventors: Tatsuya Saito; Satoshi Hamano, both of Tochigi (JP)

(73) Assignee: Showa Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/671,420

(22) Filed: Sep. 27, 2000

(30) Foreign Application Priority Data

Nov. 25, 1999  (JP) ............................................. 11-333701

(51) Int. Cl.$^7$ ................................................ B60D 5/06
(52) U.S. Cl. ...................... 180/428; 280/93.514; 74/422
(58) Field of Search ................................ 180/428, 444; 280/93.514, 93.515; 74/422, 498; 411/122, 123, 124, 132, 136, 169, 147, 148

(56) References Cited

U.S. PATENT DOCUMENTS

| 1,229,679 A | * | 6/1917 | Jones |
| 2,192,378 A | * | 3/1940 | Horger |
| 4,028,957 A | * | 6/1977 | Wright ................... 280/93.515 |
| 4,479,400 A | * | 10/1984 | Rieger ......................... 180/428 |
| 4,865,149 A |   | 9/1989 | Rohrbach et al. ........... 180/148 |
| 5,409,337 A | * | 4/1995 | Muyskens et al. .......... 411/148 |
| 6,102,952 A | * | 8/2000 | Koshino ....................... 623/18 |
| 6,273,209 B1 | * | 8/2001 | Saito et al. .................. 180/428 |
| 6,273,210 B1 | * | 8/2001 | Saito et al. .................. 180/400 |

FOREIGN PATENT DOCUMENTS

| DE | 2809781 | * | 9/1978 | ................... 74/422 |
| GB | 1158891 | * | 7/1969 | ................... 74/498 |
| JP | 101118  | * | 6/1982 | ................... 74/422 |
| JP | 6184078 |   | 6/1986 | |

* cited by examiner

Primary Examiner—Daniel G. DePumpo
(74) Attorney, Agent, or Firm—Orum & Roth

(57) ABSTRACT

A tie rod mounting structure in a center take-off type power steering apparatus comprises the following: respective inner ends of a pair of right and left tie rods are swingably connected to a leg portion of a T-shaped connection member, both arm portions of the T-shaped connection member are respectively connected to a rack shaft by a bolt extending through a guide shoe sliding within a notch groove formed along a lengthwise direction of a gear box housing, and the respective inner ends of the pair of right and left tie rods laterally move in accordance with a lateral motion of the rack shaft while being guided by the guide shoe.

20 Claims, 7 Drawing Sheets

TIE ROD MOUNTING STRUCTURE IN CENTER TAKE-OFF TYPE POWER STEERING APPARATUS

BACKGROUND OF THE INVENTION

1. Field of the Invention

The present invention relates to a tie rod mounting structure in a center take-off type power steering apparatus for a vehicle. More particularly the invention relates to a tie rod mounting structure in a center take-off type power steering apparatus which reduces slackness in the tie rod mounting portion and improves a freedom degree of layout for the tie rod.

2. Description of the Related Art

The conventional tie rod mounting structure in the center take-off type power steering apparatus is made, for example, in the structure described in Japanese Utility Model Application Laid-Open Publication No. 61-84078. This states that a ball joint is employed for a portion in which an inner end of the tie rod is swingably connected to an end portion of a rack shaft. A joint main body portion of the ball joint is screwed and joined to the end portion of the rack shaft, whereby the inner end of the tie rod is swingably connected to the end portion of the rack shaft.

In this case, to prevent the ball joint main body from rotating around an axis of the rack shaft, thereby the screw joint being slacked, a lock washer for preventing slackness is interposed between the joint main body portion of the ball joint and the end portion of the rack shaft.

The lock washer disposed to the joint main body portion on a hexagonal surface, and disposed to the end portion of the rack shaft on a cylindrical surface. Then, a part of the portion fitting on the cylindrical surface is struck into a notch formed on an outer peripheral surface of the end portion of the rack shaft, whereby the joint main body portion is prevented from rotating around the axis of the rack shaft. Accordingly, it is intended to prevent the joint main body portion of the ball joint from being slacked with respect to the end portion of the rack shaft.

However, the means mentioned above can not be employed for the tie rod mounting portion in the center take-off type power steering apparatus. Due to the many parts necessary in the tie rod mounting portion in the center take-off type power steering apparatus, to insert a tool for striking the cylindrical surface of the lock washer into the notch in the opposing part is difficult.

Further, in the structure described in Japanese Patent Application Lad-Open Publication No. 11-99954. Since respective inner ends of a pair of right and left tie rods are respectively connected to a rack shaft by one bolt extending through a guide shoe sliding within a notch groove formed along a lengthwise direction of a gear box housing, a freedom degree of layout for a pair of right and left tie rods is limited. In addition, in this case, there is a risk that the respective inner ends of a pair of right and left tie rods are brought into contact with a dust boot.

SUMMARY OF THE INVENTION

An object of the present invention is to provide a tie rod mounting structure in a center take-off type power steering apparatus. The apparatus can solve the problems mentioned above contained in the conventional tie rod mounting structure in the center take-off type power steering apparatus. It can inexpensively prevent slackness of the tie rod mounting portion by a simple structure and improve a freedom degree of layout for the tie rod.

In accordance with the present invention, there is provided a tie rod mounting structure in a center take-off type power steering apparatus. The respective inner ends of a pair of right and left tie rods are swingably connected to a leg portion of a T-shaped connection member. Both arm portions of the T-shaped connection member are respectively connected to a rack shaft by a bolt extending through a guide shoe sliding within a notch groove formed along a lengthwise direction of a gear box housing. The respective inner ends of a pair of right and left tie rods laterally move in accordance with a lateral motion of the rack shaft while being guided by the guide shoe.

BRIEF DESCRIPTION OF THE DRAWINGS

The present invention will be more fully understood from the detailed description given below and from the accompanying drawings which should not be taken to be a limitation on the invention, but are for explanation and understanding only. The drawings

DESCRIPTION OF THE PREFERRED EMBODIMENTS

A description will be given below of an embodiment (first embodiment) with reference to FIGS. 1 to 10.

Figure 1:
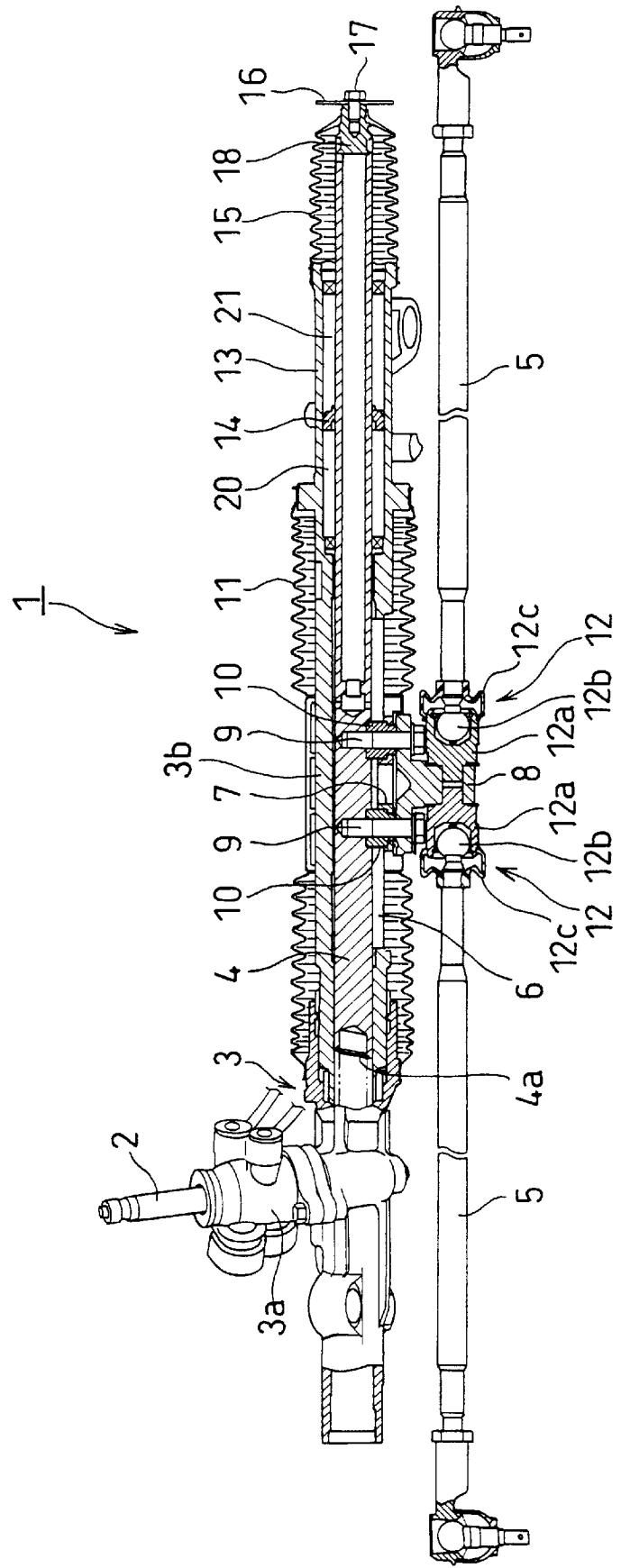
FIG. 1 is a front elevational cross sectional view of a center take-off type power steering apparatus to which a tie rod mounting structure in accordance with an embodiment (first embodiment) of the present invention is applied, a part of which is shown by an outer surface view.

In FIG. 1, a center take-off type hydraulic power steering apparatus 1 to which a tie rod mounting apparatus in accordance with a first embodiment is applied is a rack and pinion type power steering apparatus. A steering input shaft 2 connected to a handle of a vehicle (not shown) is connected to an output shaft (not shown) via a torsion bar within a rotary valve receiving portion 3a of a gear box housing 3. A rack shaft 4 having a rack 4a meshing with a pinion formed in the output shaft is received within a rack shaft receiving portion 3b of the gear box housing 3 in such a manner as to freely slide in a lateral direction in FIG. 1.

Further, a pair of right and left tie rods 5 and 5 are provided so that respective inner ends thereof are positioned near a center portion of the rack shaft receiving portion 3b of the gear box housing 3 (near a center portion of a vehicle body).

A notch groove 6 is formed along a predetermined length in a substantially center portion in a lengthwise direction of the rack shaft receiving portion 3b of the gear box housing 3, and the structure is made such that a guide shoe 7 can integrally move within the notch groove 6 in a lateral direction together with the rack shaft 4. Although a detailed illustration is omitted, the guide shoe 7 is a narrow plate body in which both end portions are formed in a semicircular shape and override between the respective inner ends of a pair of right and left tie rods 5 and 5, and a circular hole is punched out in the center portion. Accordingly, the portion is shown by a reverse printing in FIGS. 1 to 3.

The guide shoe 7 guides the respective inner end portions of a pair of right and left tie rods 5 and 5 so as to integrally move in a lateral direction together with the rack shoe 4. Accordingly, the respective inner end portions of the tie rods 5 and 5 are swingably connected to a leg portion 8a of a metal connection member 8 having a T-shaped cross section. Both arm portions 8b and 8b of the connection member 8 are connected to the rack shaft 4 via a collar 10 by a pair of right and left bolts 9 and 9 extending through the guide shoe 7. In accordance with the connection and joint structure among the respective inner end portions of the tie rods 5 and 5, the connection member 8, the guide shoe 7 and the rack shaft 4 mentioned above, these elements integrally move in a lateral direction.

Figure 2:
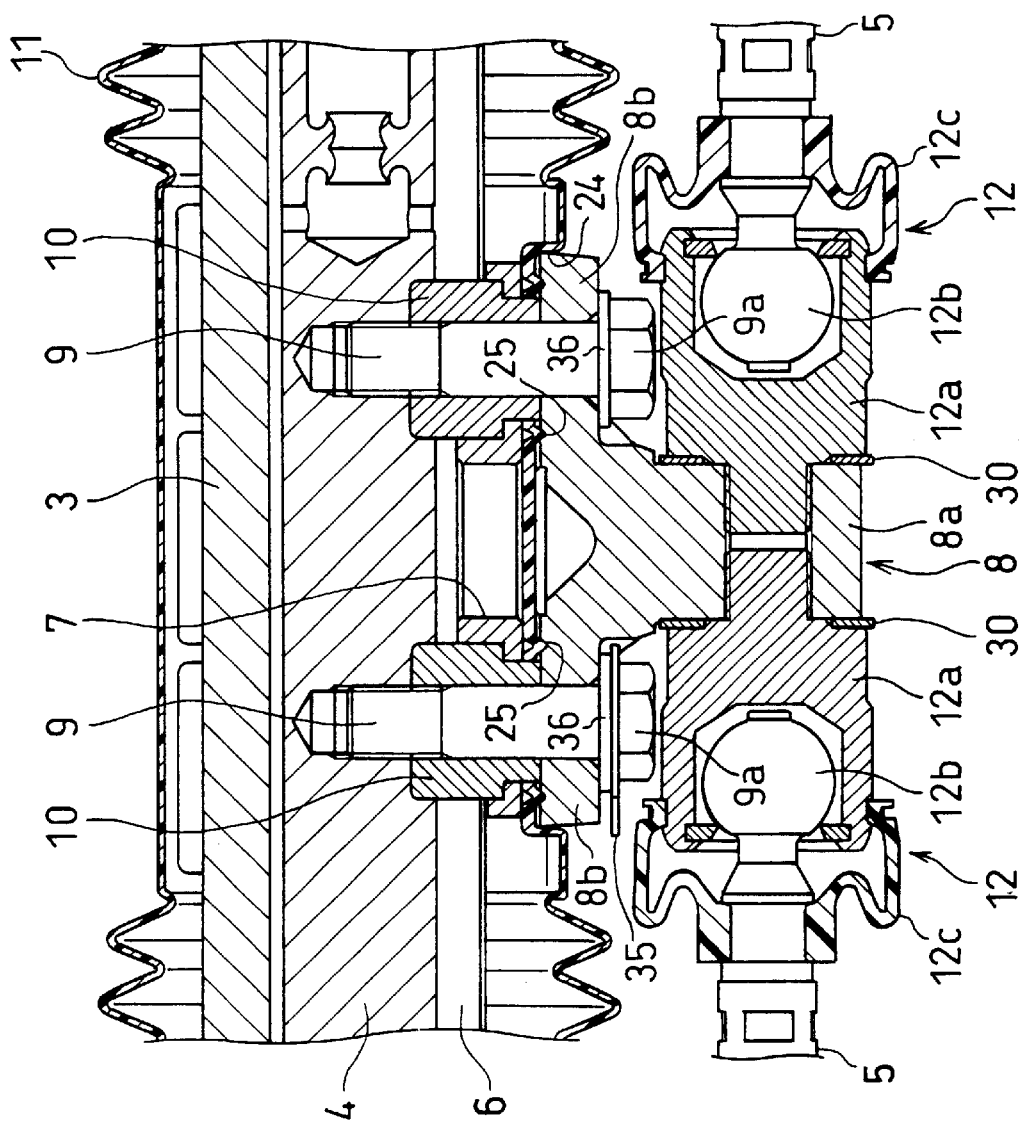
FIG. 2 is an enlarged view of a main portion of FIG. 1.
Figure 2A:
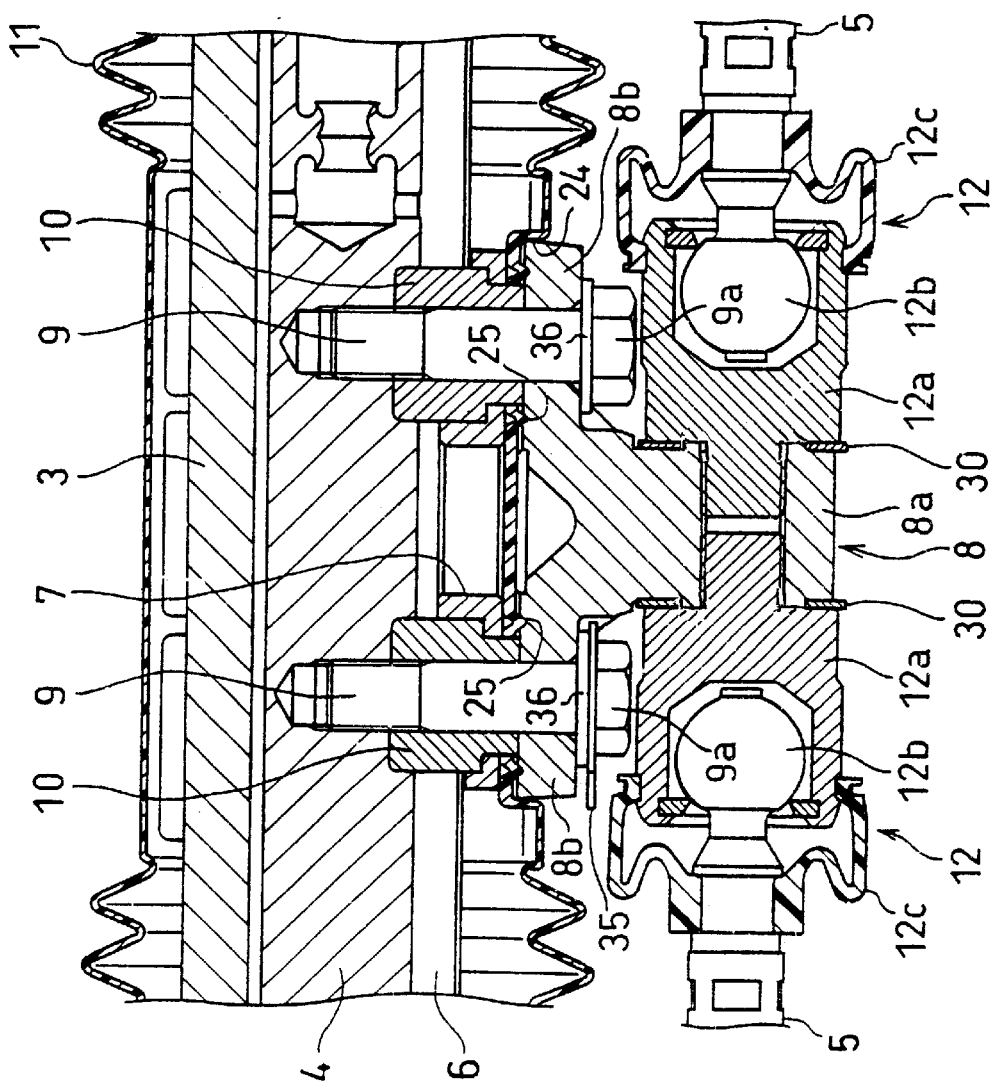
FIG. 2A is an enlarged view of a main portion of FIG. 1, according to a second embodiment.
Figure 3:
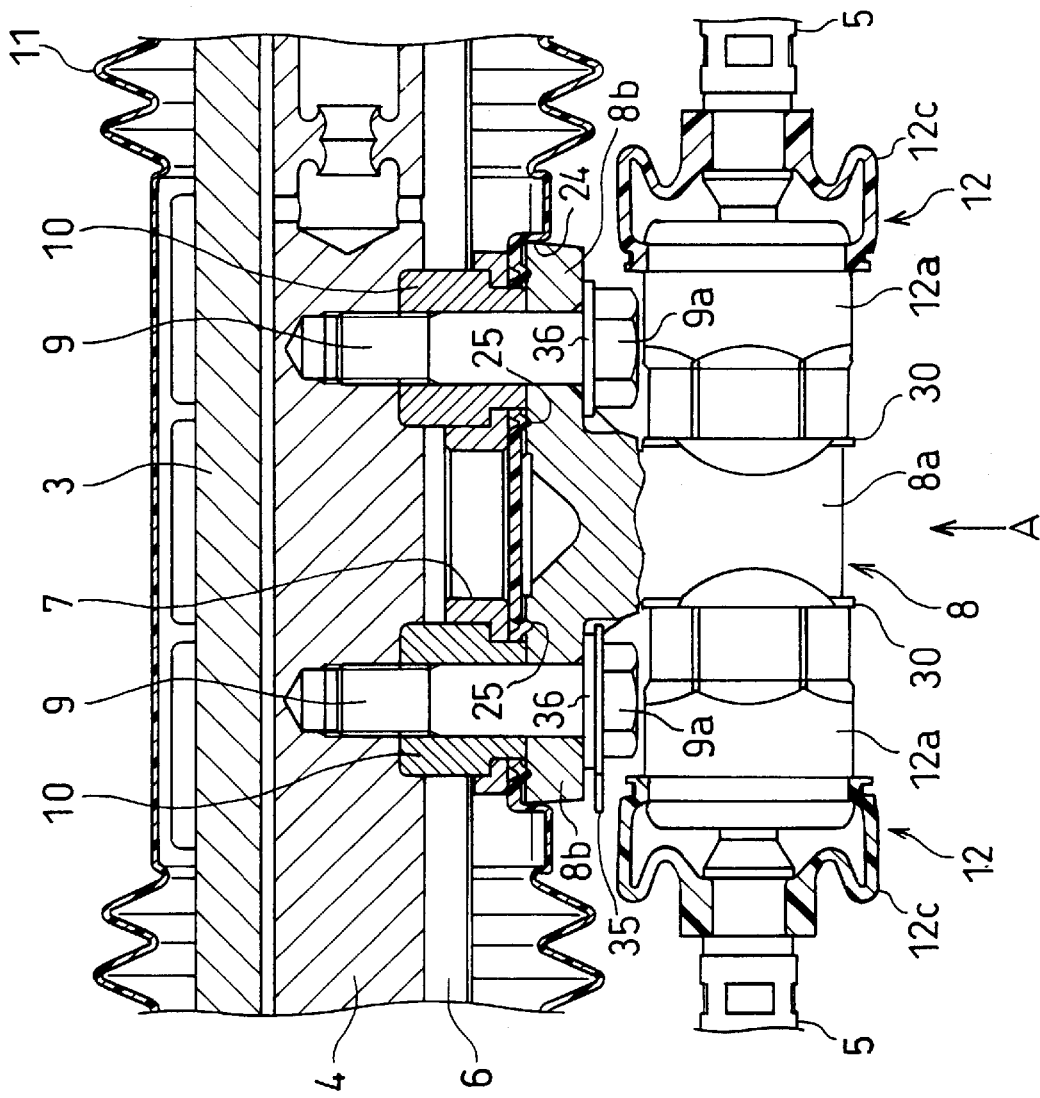
FIG. 3 is an outer surface view showing a portion in which respective inner ends of a pair of right and left tie rods are connected to a leg portion of a T-shaped connection member in FIG. 2.
Figure 4:
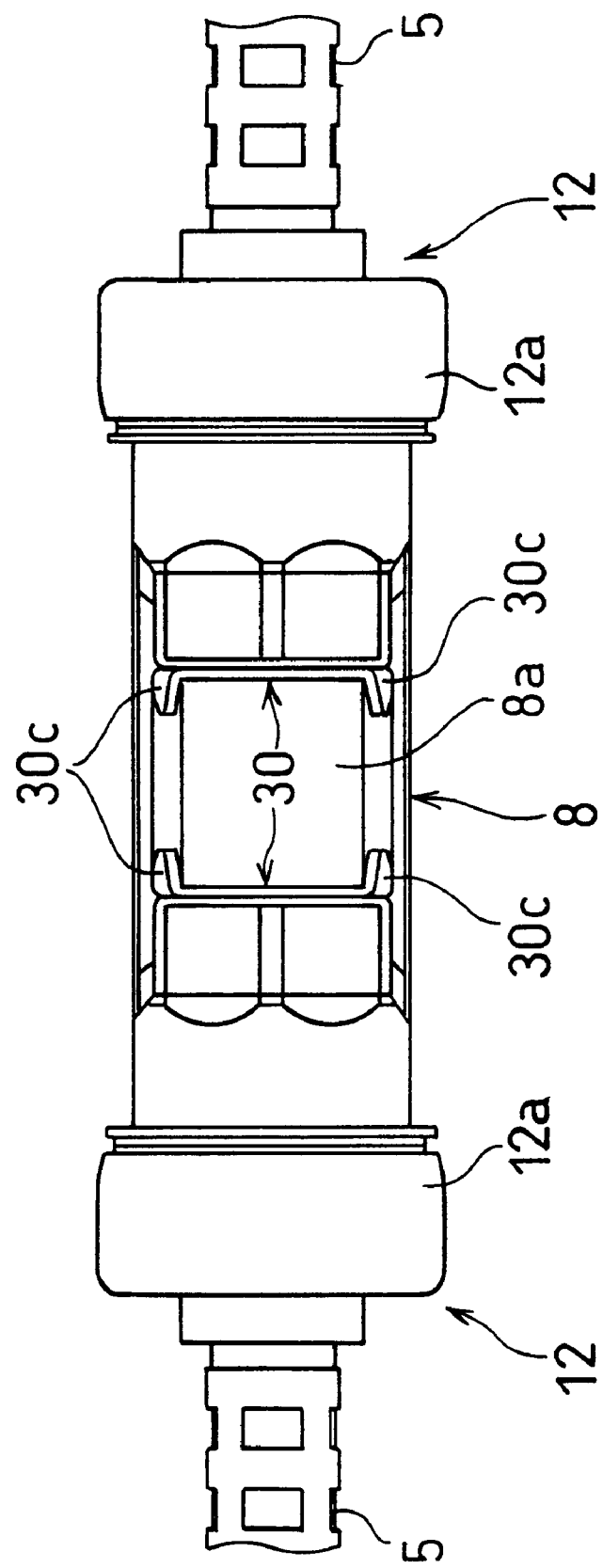
FIG. 4 is a side elevational view as seen from a direction of A in FIG. 3, showing only the portion in which the respective inner ends of a pair of right and left tie rods are connected to the leg portion of the T-shaped connection member in a covering and removing manner.

A center portion of a dust boot 11 is gripped between both of the arm portions 8b and 8b of the connection member 8 and the guide shoe 7 by extending the bolts 9 and 9 therethrough as shown in FIGS. 1 to 3. The structure is made such that respective right and left half portions of the dust boot 10 can extend and compress in accordance with a lateral motion of the rack shaft 4 and the tie rods 8 and 8. In this case, the extended portions of the collars 10 and 10 are respectively interposed between the dust boot 11 and the bolts 9 and 9, in a portion where a center portion of the dust boot 11 is extended therethrough by the bolts 9 and 9.

The dust boot 11 covers the center portion of the rack shaft receiving portion 3b in the gearbox housing 3. The center portion corresponds to an area surrounded by the rotary valve receiving portion 3a of the gear box housing 3 and a portion near a left end of a power cylinder 13 mentioned below in FIG. 1.

The collar 10 is fitted all around the rack shaft 4, the guide shoe 7 and the dust boot 11 so as to position the rack shaft 4, the guide shoe 7, the dust boot 11 and both of the arm portions 8b and 8b of the connection member 8 with respect to each other. One end portion (a lower end portion in FIG. 2) of the collar 10 protrudes from the dust boot 11, and a flat lower end surface thereof is brought into contact with a flat upper surface (an end surface facing to the dust boot 11) of the arm portion 8b in the connection member 8, thereby constituting one seal portion for preventing water from entering.

A structure of a portion in which the respective inner end portions of the tie rods 5 and 5 are swingably connected to the connection member 8 is made as follows.

As shown in FIGS. 1 to 3, a bearing body (a joint main body portion) 12a which forms the main body of a ball joint 12 is engaged with each of both side surfaces of the leg portion 8a of the connection member 8 which has the T-shaped cross section in a laterally symmetrical manner. The spherical body portions 12b and 12b in the respective inner ends of the tie rods 5 and 5 are inserted to bearing recess portions of the bearing bodies 12a and 12a so as not to be disengaged. Accordingly, the respective inner end portions of the tie rods 5 and 5 are swingably connected to the connection member 8. In this case, a structure preventing slackness of this portion will be in detail described later. A cover 12c is put on a connection portion between the bearing recess portion of the bearing body 12a and the spherical body portion 12b so as to cover the connection portion.

A portion close to a right end in FIG. 1 of the rack shaft receiving portion 3b of the gear box housing 3 is set to a power cylinder 13. Then, an end of the rack shaft 4 commonly serving as a power piston rod extends through the power cylinder 13 in a direction of a wheel house (not shown) of a vehicle so as to protrude. As mentioned above, one end of the rack shaft 4 extends through the power cylinder 13 so as to protrude, whereby within a chamber of the power cylinder 13, right and left pressure receiving areas of a piston 14 integrally provided in the rack shaft 4 are made equal to each other.

Respective end portions of a dust boot 15 are adhered to one end of the rack shaft 4 protruding from the power cylinder 13 and one end of a housing of the power cylinder 13 in the same side as the one end. The portion obtained by one end of the rack shaft 4 extending through the power cylinder 13 is covered by the dust boot 15. The dust boot 15 prevents the water from entering into the gearbox housing 3 and keeps the body safe.

A boot guard 16 is integrally mounted to one end of the rack shaft 4 by being fastened to an end surface of a rack end plug 18 by means of a bolt 17. The boot guard 16 comprises: a metal disc, has an outer diameter which is substantially the same as a maximum diameter in the case that the dust boot 15 extends maximum, shuts a side facing to the wheel house of the dust boot 15 and protects the dust boot 15 from a snow wall attached and frozen on the inner and outer surfaces in the chamber wall of the wheel house.

A pressurized oil generating a steering assist force is flowed in to and out from oil chambers 20 and 21 formed by being separated into right and left portions by the piston 14 within the chamber of the power cylinder 13 in accordance with a switching control of a rotary valve (not shown) received within the rotary valve receiving portion 3a of the gear box housing 3.

Accordingly, when the handle of the vehicle is steered and the rack 4a of the rack shaft 4 is meshed with an output shaft and a pinion connected to the handle shaft in an interlocking manner so as to laterally move. The guide shoe 7 and the tie rods 5 and 5 integrally move in a lateral direction in accordance with the lateral motion, whereby right and left wheels are steered. At the same time, the steering assist force in correspondence to a steering resistance of the wheel acts on the piston 14 so as to be transmitted to the wheel via the lateral motion of the rack shaft 4 and the tie rods 5 and 5.

Next, a description will be given of a seal structure of the mounting portion of the respective inner end portions of the tie rods 5 and 5 to the rack shaft 4.

The seal structure is realized in the portion in which the center portion of the dust boot 11 is extended between the guide shoe 7 and both of the arm portions 8b and 8b of the connection member 8 by the bolts 9 and 9 so as to be gripped.

A stepped recess portion 24 has a width in which both of the arm portions 8b and 8b of the T-shaped connection member 8 can just fit. It is formed in the portion in which the center portion of the dust boot 11 is extended through by the bolts 9 and 9. The stepped recess portion 24 is not in detail illustrated, however, formed in an oval shape having semi-circular portions in both ends. The shape coincides with a contour shape of an end surface in the side of the dust boot 11 of both of the arm portions 8b and 8b of the connection member 8.

One end portion in a small diameter side of each of the collars 10 and 10 interposed between the dust boot 11 and the bolts 9 and 9 protrudes from a bottom surface of the stepped recess portion 24 in the center portion of the dust boot 11, as mentioned above. It is brought into contact with the end surface in the side of the dust boot 11 of both of the arm portions 8b and 8b of the connection member 8.

Annular protruding walls 25 and 25 are respectively formed in the portion in which the center portion of the dust boot 11 is extended through by the bolts 9 and 9. This is done in such a manner as to surround one end portion in the small diameter side of the collars 10 and 10 and be brought into contact with the end surface in the side of the dust boot 11 of the arm portions 8b and 8b of the T-shaped connection member 8. Then, a seal member (not shown) constituted by an O-ring is interposed so as to surround the annular protruding wall 25.

Accordingly, the seal structure of the mounting portion with respect to the rack shaft 4 of the respective inner end portions of the tie rods 5 and 5 is arranged such that one end portion of the collars 10 and 10 is brought into contact with the end surface in the side of the dust boot 11 of both of the arm portions 8b and 8b of the connection member 8. This brings the annular protruding walls 25 and 25 into contact with the end surface in the side of the dust boot 11 of the arm portions 8b and 8b of the connection member 8. The seal member interposed between the bottom surface of the stepped recess portion 24 of the dust boot 11 and the end surface in the side of the dust boot 11 of both of the arm portions 8b and 8b of the connection member 8.

The portion in which both of the arm portions 8b and 8b of the T-shaped connection member 8 are just fit to the stepped recess portion 24 partly provides a seal function. However, it mainly functions as a portion receiving a reaction force in a compression direction from the dust boot 11 when the force is transmitted to the dust boot 11 via the collar 10 in accordance with lateral motion of the rack shaft 4. Accordingly, it is possible to prevent stress from being generated in each of the portions constituting the seal structure. In particular, since the bolt through hole of the dust boot 11 (the fitting hole of the collar 10) is prevented from being deformed, reliability of the seal is widely improved.

Next, a description will be in detail described below of a slackness prevention structure for the mounting portion of the respective inner end portions of the tie rods 5 and 5 to the rack shaft 4.

At first, a description will be given of a slackness prevention structure for the portion in which the respective inner end portions of the tie rods 5 and 5 are swingably connected to the leg portion 8a of the connection member 8 via the ball joint 12.

The bearing bodies (the joint main body portions) 12a constituting the main body of the ball joint 12 are respectively screwed to both side surfaces of the leg portion 8a of the connection member 8. The connection has a T-shaped cross section in a laterally symmetrical manner, as mentioned above. However, in this case, a first lock washer 30 is interposed between the respective side surfaces of the leg portion 8a and the bearing body 12a of the ball joint 12, as is well illustrated in FIGS. 2 to 4.

Figure 7:
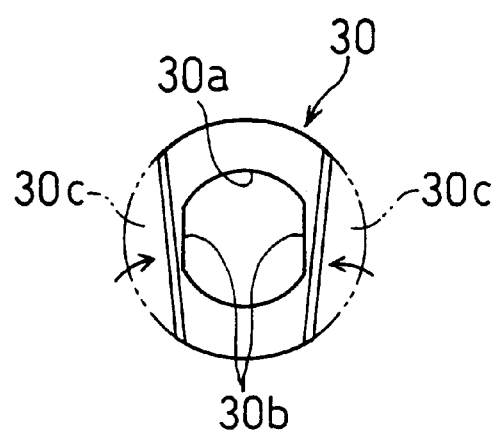
FIG. 7 is a front elevational view of a first lock washer used for the portion in which the respective inner ends of a pair of right and left tie rods are connected to the leg portion of the T-shaped connection member in a used state.
Figure 8:
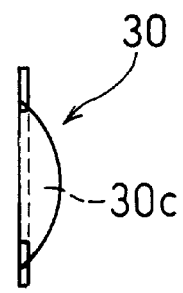
FIG. 8 is a left side elevational view of FIG. 7.

The first lock washer 30 is formed in an annular plate shape with a central hole as shown in FIGS. 7 and 8. It is used in a state that right and left outer peripheral edge portions 30c and 30c thereof are bent in symmetrical with a surface passing through the axis (refer to an arrow in FIG. 7). A central hole 30a has two parallel surfaces 30b and 30b in symmetrical with the surface passing through the same axis.

The right and left outer peripheral edge portions 30c and 30c of the first lock washer 30 are opposed to each other so that the respective surfaces are inclined so as to be tapered in a front view in a state of being bent as mentioned above (refer to FIG. 7). An angle of the taper coincides with an angle of the taper formed by the upper and lower surfaces in FIG. 4 of the leg portion 8a of the connection member 8 between the base end portion and the front end portion in the leg portion 8a (refer to FIG. 4). The leg portion 8a is formed in a rectangular shape in a horizontal cross section.

Figure 5:
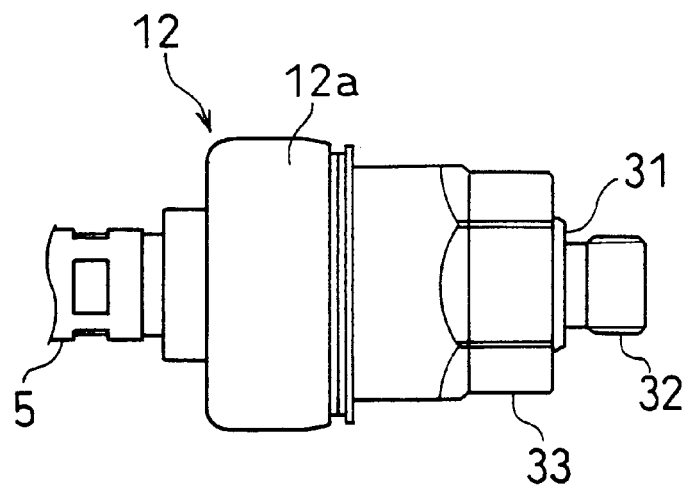
FIG. 5 is a front elevational view of a ball joint used for the portion in which the respective inner ends of a pair of right and left tie rods are connected to the leg portion of the T-shaped connection member.
Figure 6:
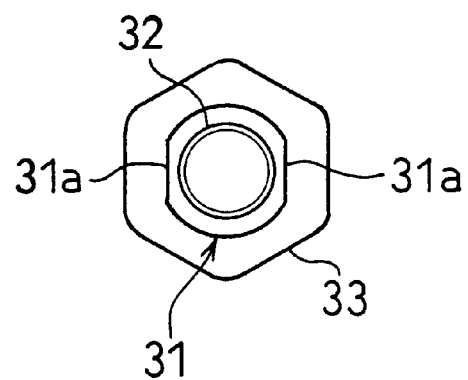
FIG. 6 is a right side elevational view of FIG. 5.

A step portion 31 has two parallel surfaces 31a and 31a and is formed on an end surface in the side in which a male screw 32 is formed in the bearing body 12a in order to engage the bearing body 12a of the ball joint 12 with one side surface of the leg portion 8a of the connection member 8, as shown in FIGS. 5 and 6. The height of the step portion 31 just coincides with a thickness of the first lock washer 30. A contour shape of an outer peripheral surface having two lines 31a and 31a which are parallel in a front view of the step portion 31 just coincides with the central hole 30a of the first lock washer 30.

Accordingly, in the case that the first lock washer 30 is brought into contact with the end surface of the bearing body 12a of the ball joint 12, the central hole 30a is just fitted to the step portion 31. Two parallel surfaces 30b and 30b are overlapped with two parallel surfaces 31a and 31a and the first lock washer 30 is set not to be rotatable with respect to the bearing body 12a of the ball joint 12.

The male screw 32 of the bearing body 12a is screwed to the female screw formed on one side surface of the leg portion 8a of the connection member 8. It is screwed in a state that the first lock washer 30 is brought into contact with the end surface of the bearing body 12a in the manner mentioned above. Thus the ball joint 12 is connected to the leg portion 8a of the connection member 8. This engagement can be easily performed by bringing a tool (not shown) into contact with a hexagonal surface 33 formed in the end surface side of the bearing body 12a even in a state that the ball joint 12 is assembled.

In the manner mentioned above, the respective inner end portions of the tie rods 5 and 5 are swingably connected to the leg portion 8a of the connection member 8 via the ball joint 12. However, finally, the right and left outer peripheral edge portions 30c and 30c of the first lock washer 30 are respectively bent in such a manner as to overlap with the upper and lower surfaces of the leg portion 8a of the connection member 8. Accordingly, the ball joint 12 and the tie rods 5 and 5 including the ball joint 12 are prevented from being slacked with respect to the leg portion 8a of the connection member 8 in the side of the respective inner end portions of the tie rods 5 and 5.

In this case, the portion between the upper and lower surfaces of the leg portion 8a of the connection member 8 is tapered as mentioned above. Therefore, being narrowed from the base end portion of the leg portion 8a toward the front end portion. The bending process mentioned above of the right and left outer peripheral edge portions 30c and 30c in the first lock washer 30 can be performed even when being relatively apart from the main body portion of the power steering apparatus 1 (the portion covered by the dust boot 11), and the process can be easily performed.

Next, a description will be given of a slackness prevention structure of the portion in which both of the arm portions 8b and 8b of the T-shaped connection member 8 are respectively connected to the rack shaft 4 by the bolts 9 and 9.

A second lock washer 35 is interposed between at least one arm portion 8b (the left arm portion 8b in FIGS. 2 and 3 in the present first embodiment) among both of the arm portions 8b and 8b, and a head portion 9a of the bolt 9, in the portion in which both of the arm portions 8b and 8b of the T-shaped connection member 8 are respectively connected to the rack shaft 4 by the bolts 9 and 9.

Figure 9:
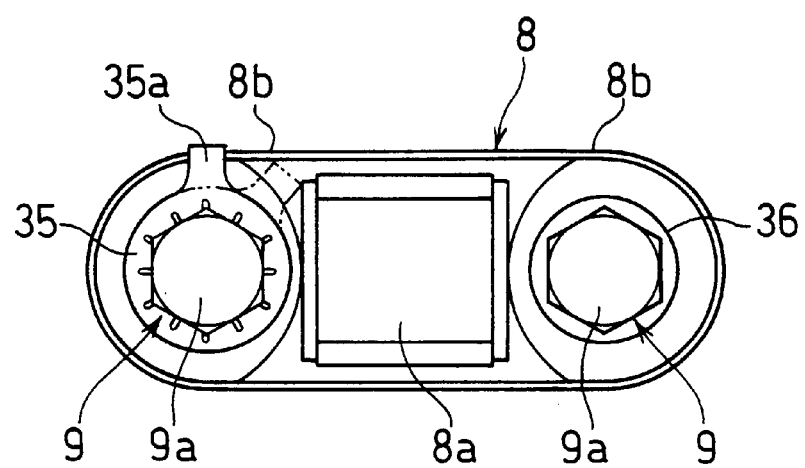
FIG. 9 is a front elevational view of a portion in which both arm portions of the T-shaped connection member are bolted and connected to a rack shaft.
Figure 10:
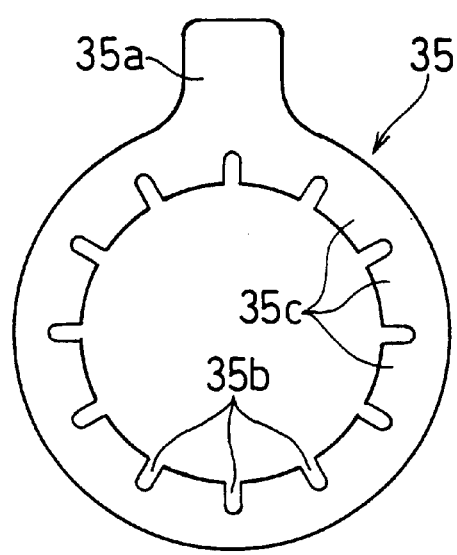
FIG. 10 is a front elevational view of a second lock washer used for the same portion.

The second lock washer 35 is, as shown in FIGS. 9 and 10, comprises a relatively narrow annular plate body. A projection 35a is formed from one portion in a circumferential direction so as to direct outward in a direction of a plate surface. Further, a plurality of slits 35b, 35b, . . . are cut in an inner peripheral portion in a radial direction, and elastic piece portions 35c are formed between the adjacent slits 35b and 35b among the slits 35b, 35b, . . .

The adjacent elastic piece portions 35c and 35c are slightly bent in an opposing direction to each other so as to be elastically contact with the bolt 9 in a direction of increasing the fastening of the bolt 9 when the second lock washer 35 is interposed between the arm portion 8b of the connection member 8 and the head portion 9a of the bolt 9 and the bolt 9 is fastened. Accordingly, the bolt 9 is partly locked (prevented from being slacked).

Even when the fastening of the bolt 9 is slacked, the bolt 9 rotates in a direction of removing the fastening. The second lock washer 35 rotates in the same direction in accordance therewith in spite of this partly lock of the bolt 9, the projection 35a of the second lock washer 35 is brought into contact with the base end portion of the leg portion 8a of the connection member 8 (refer to a two-dot chain line in FIG. 9). Accordingly, the second lock washer 35 ceases rotation, and the bolt 9 can be securely prevented from being slacked. The second lock washer 35 ceases rotation at one rotation or more. As mentioned above, the portion in which both of the arm portions 8b and 8b of the T-shaped connection member 8 are respectively connected to the rack shaft 4 by the bolts 9 and 9 is prevented from being slacked.

The interposition of the second lock washer 35 between the arm portion 8b of the T-shaped connection member 8 and the head portion 9a of the bolt 9 may be applied to the portion between any one arm portion 8b among both of the arm portions 8b and 8b of the T-shaped connection member 8 and the head portion 9a of the bolt 9. Because the T-shaped connection member 8 does not fall off from the rack shaft 4 as far as both of the bolts 9 and 9 do not fall off from the rack shaft 4.

In the case that the leg portion 8a of the T-shaped connection member 8 is designed to be relatively short, the head portion 9a of the bolt 9 is brought into contact with the outer peripheral surface of the bearing body 12a of the ball joint 12 before the bolt 9 falls off from the rack shaft 4. Accordingly, in this case, it is impossible that the T-shaped connection member 8 falls off from the rack shaft 4.

A seal member 36 such as an O-ring or the like may be interposed between the arm portion 8b of the T-shaped connection member 8 and the head portion 9a of the bolt 9 as occasion demands. In this case, the second lock washer 35 is interposed between the seal member 36 and the head portion 9a of the bolt 9. The seal member 36 prevents water from entering from the bolt extending portion of the arm portion 8b within the dust boot 11 and further within the gear box housing 3.

Since the mounting structure for the tie rod 5 in the center take-off type power steering apparatus 1 in accordance with the present first embodiment is structured as mentioned above, the following effects can be obtained.

The structure is made such that the respective inner ends of a pair of right and left tie rods 5 and 5 are swingably connected to the leg portion 8a of the T-shaped connection member 8. Both of the arm portions 8b and 8b of the T-shaped connection member 8 are respectively connected to the rack shaft 4 by the bolts 9 and 9 extending through the guide shoe 7. It slides within the notch groove 6 formed along the lengthwise direction of the gear box housing 3, and the respective inner ends of a pair of right and left tie rods 5 and 5 laterally move in correspondence to the lateral motion of the rack shaft 4 while being guided by the guide shoe 7.

As mentioned above, in the mounting structure for the tie rod 5 in accordance with the present first embodiment, the T-shaped connection member 8 is used for connecting the respective inner ends of a pair of right and left tie rods 5 and 5 to the rack shaft 4. Then, the respective inner ends of a pair of right and left tie rods 5 and 5 are swingably connected to the leg portion 8a of the T-shaped connection member 8. Both of the arm portions 8b and 8b of the T-shaped connection member 8 are respectively connected to the rack shaft 4 by the bolts 9 and 9.

As a result, a direction of connecting the respective inner ends of a pair of right and left tie rods 5 and 5 to the leg portion 8a of the T-shaped connection member 8 and a direction of connecting both of the arm portions 8b and 8b of the T-shaped connection member 8 to the rack shaft 4 cross each other. A direction of taking out the respective bolts 9 for connecting both of the arm portions 8b and 8b of the T-shaped connection member 8 to the rack shaft 4 crosses the respective inner ends of a pair of right and left tie rods 5 and 5. Particularly speaking, the bearing body 12a of the ball joint 12. Therefore, there is no risk that the bolt 9 is fallen off. Therefore, the slackness prevention in the mounting portion for the tie rod 5 should be considered only with respect to the connection portion of the respective inner ends of a pair of right and left tie rods 5 and 5 to the leg portion 8a of the T-shaped connection member 8. Accordingly, the slackness prevention structure in the mounting portion for the tie rod 5 can be simplified and it is possible to reduce a production cost.

Further, by suitably adjusting a length of the leg portion 8a of the T-shaped connection member 8, it is possible to arrange the tie rod 5 in various kinds of attitudes. One configuration involves arranging the tie rod 5 in parallel to the rack shaft 4 and arrange the outer end of the tie rod 5 so as to be inclined upward or downward with respect to the rack shaft 4. Thus it is possible to improve a freedom degree of layout of the tie rod 5.

Further, the structure is made such that the center portion of the dust boot 11 is gripped between the guide shoe 7 and both of the arm portions 8b and 8b of the T-shaped connection member 8 by being extended through by the bolts 9 and 9. The collars 10 and 10 are fitted between the guide shoe 7 and the bolts 9 and 9 and between the dust boot 11 and the bolts 9 and 9 around the rack shaft 4, the guide show 7 and the dust boot 11. One end portion of each of the collars 10 protrudes from the dust boot 11 so as to be brought into contact with the arm portion 8b of the T-shaped connection member 8.

As a result, the rack shaft 4, the guide shoe 7, the dust boot 11 and the T-shaped connection member 8 are mutually positioned by the collars 10 and 10. These elements are integrally assembled by the bolts 9 and 9. The lateral motion of the rack shaft 4 is smoothly transmitted to the respective inner ends of a pair of right and left tie rods 5 and 5.

Further, the ball joint 12 is interposed in the portion in which the respective inner ends of a pair of right and left tie rods 5 and 5 are swingably connected to the leg portion 8a of the T-shaped connection member 8. The spherical body portion 12b of the respective inner ends in a pair of right and left tie rods 5 and 5 are inserted to the bearing recess portion of the bearing body (the joint main body portion) 12a of the ball joint 12 so as not to be disengaged. The bearing body 12a of the ball joint 12 is screwed to the leg portion 8a of the T-shaped connection member 8 via the first lock washer 30. The step portion 31 which has two parallel surfaces is formed on the end surface in the side where the connecting screw 32 is formed. In the bearing body 12a of the ball joint 12, the hole 30a fitting to the step portion 31 is formed in the center portion of the first lock washer 30. The hole 30a of the first lock washer 30 is disposed to the step portion 31 of the bearing body 12a of the ball joint 12. The first lock washer 30 is interposed between the bearing body 12a of the ball joint 12 and the leg portion 8a of the T-shaped connection member 8. Finally, the outer peripheral edge portions 30c and 30c of the first lock washer 30 are caulked to the leg portion 8a side of the T-shaped connection member 8, whereby the bearing body 12a of the ball joint 12 is prevented from being slacked.

As a result, the hole 30a in the center portion of the first lock washer 30 is fitted to the step portion 31 of the bearing body 12a of the ball joint 12 and the outer peripheral edge portions 30c and 30c of the first lock washer 30 are caulked to the leg portion 8a side of the T-shaped connection member 8. This leads to the bearing body 12a of the ball joint 12 being prevented from being slacked with respect to the T-shaped connection member 8. Therefore, it is not necessary to form the conventional notch for preventing the slackness in both of the members in which the first lock washer 30 is interposed (the bearing body 12a of the ball joint 12 or the leg portion 8a of the T-shaped connection member 8). Also it is not necessary to strike a part of the fitting surface of the first lock washer 30 into the notch. Further, since the outer peripheral edge portions 30c and 30c of the first lock washer 30 are caulked to the leg portion 8a side of the T-shaped connection member 8, a caulking position is stabilized. Accordingly, the slackness prevention structure for the tie rod mounting portion can be further simplified and can be easily applied to an automation of production, and it is possible to further reduce a production cost.

Further, in the portion in which both of the arm portions 8b and 8b of the T-shaped connection member 8 are respectively connected to the rack shaft 4 by the bolts 9 and 9 extending through the guide shoe 7, the second lock washer 35 having the projection 35a in the surface direction is interposed between at least any one arm portion 8b among both of the arm portions 8b and 8b of the T-shaped connection member 8. The head portion 9a of the bolt 9, and the structure is made such that the projection 35a of the second lock washer 35 can be brought into contact with the leg portion 8a of the T-shaped connection member 8 when the second lock washer 35 rotates.

As a result, even when the fastening of the bolts 9 and 9 respectively connecting both of the arm portions 8b and 8b of the T-shaped connection member 8 to the rack shaft 4 is slacked, the second lock washer 35 interposed between at least any one arm portion 8b among both of the arm portions 8b and 8b of the T-shaped connection member 8 and the head portion 9a of the bolt 9 rotates at a degree less than one rotation together with the bolt 9. The projection 35a is brought into contact with the leg portion 8a of the T-shaped connection member 8. Thus the second lock washer 35 ceases rotation and the slackness of the fastening of the bolt 9 does not promote any more.

As mentioned above, without applying any process (caulking, striking or the like) to the second lock washer 35, it is possible to prevent the portion in which both of the arm portions 8b and 8b of the T-shaped connection member 8 which are connected to the rack shaft 4 by the bolts 9 and 9 from slacking. The slackness prevention structure can be significantly simplified and it is possible to further reduce the production cost.

Further, in the case that the seal member 36 is interposed between the arm portion 8b of the T-shaped connection member 8 and the head portion 9a of the bolt 9 and the second lock washer 35 is interposed between the seal member 36 and the head portion 9a of the bolt 9, it is possible to prevent the water from entering from the bolt extending portion in the arm portion 8b of the T-shaped connection member 8 within the dust boot 11. Further within the gear box housing 3 as well as preventing the portion in which both of the arm portions 8b and 8b of the T-shaped connection member 8 are respectively connected to the rack shaft 4 by the bolts 9 and 9 from slacking.

Further, in the dust boot 11, there are respectively formed the stepped recess portion 24 to which both of the arm portions 8b and 8b of the T-shaped connection member are disposed. It is also in the annular protruding wall 25 which surrounds one end portion of the collar 10 and is brought into contact with the arm portion 8b of the T-shaped connection member 8.

As a result, even when the force is transmitted to the dust boot 11 via the collar 10 in accordance with a lateral motion of the rack shaft 4 and the dust boot 11 is extended and compressed to a rack end at the maximum stroke of the rack shaft 4. A compression reaction force from the dust boot 11 is applied. Thus the step wall of the stepped recess portion 24 formed in the dust boot 11 is brought into contact with the arm portion 8b of the T-shaped connection member 8 from an axial direction of the rack shaft 4. The compulsory force is not applied to the bolt extending hole of the dust boot 11 (the fitting hole of the collar 10). The seal portion of the portion in which the annular protruding wall 25 is brought into contact with the arm portion 8b of the T-shaped connection member 8. It is possible to greatly reduce the generation of stress in the seal structure for the tie rod mounting portion constituted by the contact portion between the annular protruding wall 25 of the dust boot 11 and the arm portion 8b of the T-shaped connection member 8. The contact portion between one end portion of the collar 10 and the arm portion 8b of the T-shaped connection member 8 or the like, it is possible to maintain a waterproof performance and it is possible to improve a reliability of the seal.

Further, the seal member 26 constituted by the O-ring or the like is interposed between the bottom surface of the stepped recess portion 24 in the center portion of the dust boot 11 and the end surface in the dust boot 11 side of the arm portion 8b of the T-shaped connection member 8. Thus it surround the annular protruding wall 25, the seal structure for the tie rod mounting portion is layered and it is possible to widely improve a reliability of the seal.

Next, a description will be given of an embodiment (a second embodiment) of the invention.

In the present second embodiment, a slackness prevention structure of a portion in which the bearing body 12a of the ball joint 12 is screwed to the leg portion 8a of the T-shaped connection member 8 via the first lock washer 30 is different from the first embodiment.

That is, in the first embodiment, the step portion 31 is formed in the bearing body 12a side of the ball joint 12 and the outer peripheral edge portions 30c and 30c of the first lock washer 30 are caulked to the leg portion 8a of the T-shaped connection member 8. However, in the present second embodiment, the step portion 31 is formed in the leg portion 8a side of the T-shaped connection member 8. Also the outer peripheral edge portions 30c and 30c of the first lock washer 30 are caulked to the bearing body 12a side of the ball joint 12. Accordingly, the following structure is employed.

Although a detailed illustration will be omitted, the step portion 31 having the same two parallel surfaces as those illustrated in FIG. 6 is formed on the end surface in the side in which the connecting female screw of the leg portion 8a of the T-shaped connection member 8 is formed. The hole 30a fitting to the step portion 31 is formed in the center portion of the first lock washer 30. The hole 30a of the first lock washer 30 is fitted to the step portion 31 of the leg portion 8a of the T-shaped connection member 8. The first lock washer 30 is interposed between the bearing body 12a of the ball joint 12 and the leg portion 8a of the T-shaped connection member 8. The outer peripheral edge portions 30c and 30c of the first lock washer 30 are caulked to the bearing body 12a side of the ball joint 12. Thus the bearing body 12a of the ball joint 12 is prevented from slacking with respect to the T-shaped connection member 8.

Since there is nothing different from the first embodiment in the other points, a detailed description will be omitted.

The tie rod mounting structure in the center take-off type power steering apparatus in accordance with the second embodiment is made as mentioned above. Therefore, it is apparent that the same slackness prevention function as that of the first embodiment can be obtained. That is, [since] the hole in the center portion of the first lock washer 30 is fitted to the step portion 31 in the leg portion 8a of the T-shaped connection member 8. The outer peripheral edge portions 30c and 30c of the first lock washer 30 are caulked to the bearing portion 12a (the joint main body portion) side of the ball joint 12. Whereby the bearing portion 12a (the joint main body portion) of the ball joint 12 is prevented from slacking with respect to the T-shaped connection member 8. Thus it is not necessary to form the notch for preventing the slackness in both of the members in which the first lock washer 30 is interposed (the bearing portion 12a (the joint main body portion) of the ball joint 12 or the leg portion 8a of the T-shaped connection member 8. Also it is not necessary to strike a part of the fitting surface of the first lock washer 30 into the notch. Accordingly, the slackness prevention structure for the tie rod mounting portion can be further simplified and it is possible to further reduce a production cost. Therefore, in comparison with the first embodiment, although there is a disadvantage that the caulking position of the outer peripheral edge portions 30c and 30c of the first lock washer 30 is slightly unstable, it is substantially the same effect as that of the first embodiment can be obtained.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A tie rod mounting structure in a center take-off power steering apparatus, comprising:

respective inner ends of a pair of right and left tie rods which are swingably connected to a leg portion of a T-shaped connection member, both arm portions of said T-shaped connection member being respectively connected to a rack shaft by a bolt extending through a guide shoe sliding within a notch groove formed along a lengthwise direction of a gear box housing, wherein the respective inner ends of said pair of right and left tie rods laterally move in accordance with a lateral motion of said rack shaft while being guided by said guide shoe.

2. A tie rod mounting structure in a center take-off power steering apparatus according to claim 1, further comprising:

a center portion of a dust boot is gripped between said guide shoe and both of the arm portions of said T-shaped connection member by being extended through by said bolt, and a collar disposed between said guide shoe and said bolt and between said dust boot and said bolt so as to override between said rack shaft, said guide shoe and said dust boot, wherein one end portion of said collar protrudes from said dust boot so as to contact the arm portion of said T-shaped connection member.

3. A tie rod mounting structure in a center take-off power steering apparatus according to claim 1, comprising:

a ball joint interposed in a portion in which the respective inner ends of said pair of right and left tie rods are swingably connected to the leg portion of said T-shaped connection member, spherical portions of the respective inner ends of said pair of right and left tie rods are inserted in a bearing recess portion in a joint main body portion of said ball joint so as not to be disengaged, the joint main body portion of said ball joint being screwed to the leg portion of said T-shaped connection member via a first lock washer, a step portion having two parallel surfaces being formed on an end surface on a side in which said connecting screw in the joint main body portion of said ball joint is formed, a hole fitting to said step portion formed in a center portion of said first lock washer, said hole of said first lock washer being fitted to said step portion of the joint main body portion of said ball joint, said first lock washer being interposed between the joint main body portion of said ball joint and the leg portion of said T-shaped connection member, and an outer peripheral edge portion of said first lock washer which is caulked to the leg portion side of said T-shaped connection member, wherein the joint main body portion of said ball joint is prevented from slacking.

4. A tie rod mounting structure in a center take-off power steering apparatus according to claim 2, further comprising:

a ball joint interposed in a portion in which the respective inner ends of said pair of right and left tie rods are swingably connected to the leg portion of said T-shaped connection member, spherical portions of the respective inner ends of said pair of right and left tie rods which are inserted in a bearing recess portion in the joint main body portion of said ball joint so as not to be disengaged, the joint main body portion of said ball joint being screwed to the leg portion of said T-shaped connection member via the first lock washer, a step portion having two parallel surfaces being formed on an end surface in the side in which said connecting screw in the joint main body portion of said ball joint is formed, a hole fitting to said step portion formed in a center portion of said first lock washer, said hole of said first lock washer being fitted to said step portion of the joint main body portion of said ball joint, said first lock washer being interposed between the joint main body portion of said ball joint and the leg portion of said T-shaped connection member, and an outer peripheral edge portion of said first lock washer which is caulked to the leg portion side of said T-shaped connection member, wherein the joint main body portion of said ball joint is prevented from slacking.

5. A tie rod mounting structure in a center take-off power steering apparatus according to claim 1, further comprising:

a ball joint interposed in a portion in which the respective inner ends of said pair of right and left tie rods are swingably connected to the leg portion of said T-shaped connection member, spherical portions of the respective inner ends of said pair of right and left tie rods are inserted in a bearing recess portion in the joint main body portion of said ball joint so as not to be disengaged, the joint main body portion of said ball joint being screwed to the leg portion of said T-shaped connection member via the first lock washer, a step portion having two parallel surfaces being formed on an end surface in the side in which said connecting screw in the leg portion of said T-shaped connection member is formed, a hole fitting to said step portion formed in a center portion of said first lock washer, said hole of said first lock washer being fitted to said step portion of the leg portion of said T-shaped connection member, and said first lock washer interposed between the joint main body portion of said ball joint and the leg portion of said T-shaped connection member, and an outer peripheral edge portion of said first lock washer which is caulked to the joint main body portion side of said ball joint, wherein the joint main body portion of said ball joint is prevented from slacking.

6. A tie rod mounting structure in a center take-off power steering apparatus according to claim 2, further comprising:

a ball joint is interposed in a portion in which the respective inner ends of said pair of right and left tie rods are swingably connected to the leg portion of said T-shaped connection member, spherical portions of the respective inner ends of said pair of right and left tie rods are inserted in a bearing recess portion in the joint main body portion of said ball joint so as not to be disengaged, the joint main body portion of said ball joint being screwed to the leg portion of said T-shaped connection member via the first lock washer, a step portion having two parallel surfaces being formed on an end surface on the side in which said connecting screw in the leg portion of said T-shaped connection member is formed, a hole fitting to said step portion formed in a center portion of said first lock washer, said hole of said first lock washer being fitted to said step portion of the leg portion of said T-shaped connection member, said first lock washer being interposed between the joint main body portion of said ball joint and the leg portion of said T-shaped connection member, and an outer peripheral edge portion of said first lock washer which is caulked to the joint main body portion side of said ball joint, wherein the joint main body portion of said ball joint is prevented from slacking.

7. A tie rod mounting structure in a center take-off power steering apparatus according to claim 1, further comprising:

a portion in which both of the arm portions of said T-shaped connection member are respectively connected to the rack shaft by a bolt extending through said guide shoe, and a second lock washer having a projection in a surface direction which is interposed between at least any one of both of the arm portions of said T-shaped connection member and a head portion of said bolt, wherein the projection of said second lock washer is brought into contact with the leg portion of said T-shaped connection member when said second lock washer rotates.

8. A tie rod mounting structure in a center take-off power steering apparatus according to claim 2, further comprising:

a portion in which both of the arm portions of said T-shaped connection member are respectively connected to the rack shaft by a bolt extending through said guide shoe, and a second lock washer having a projection in a surface direction which is interposed between at least any one of both of the arm portions of said T-shaped connection member and a head portion of said bolt, wherein the projection of said second lock washer is brought into contact with the leg portion of said T-shaped connection member when said second lock washer rotates.

9. A tie rod mounting structure in a center take-off power steering apparatus according to claim 3, further comprising:

in a portion in which both of the arm portions of said T-shaped connection member are respectively connected to the rack shaft by a bolt extending through said guide shoe, and a second lock washer having a projection in a surface direction which is interposed between at least any one of both of the arm portions of said T-shaped connection member and a head portion of said bolt, wherein the projection of said second lock washer is brought into contact with the leg portion of said T-shaped connection member when said second lock washer rotates.

10. A tie rod mounting structure in a center take-off power steering apparatus according to claim 4, further comprising:

a portion in which both of the arm portions of said T-shaped connection member are respectively connected to the rack shaft by a bolt extending through said guide shoe, and a second lock washer having a projection in a surface direction which is interposed between at least any one of both of the arm portions of said T-shaped connection member and a head portion of said bolt, wherein the projection of said second lock washer is brought into contact with the leg portion of said T-shaped connection member when said second lock washer rotates.

11. A tie rod mounting structure in a center take-off power steering apparatus according to claim 5, further comprising:

a portion in which both of the arm portions of said T-shaped connection member are respectively connected to the rack shaft by a bolt extending through said guide shoe, and a second lock washer having a projection in a surface direction which is interposed between at least any one of both of the arm portions of said T-shaped connection member and a head portion of said bolt, wherein the projection of said second lock washer is brought into contact with the leg portion of said T-shaped connection member when said second lock washer rotates.

12. A tie rod mounting structure in a center take-off power steering apparatus according to claim 6, further comprising:

a portion in which both of the arm portions of said T-shaped connection member are respectively connected to the rack shaft by a bolt extending through said guide shoe, and a second lock washer having a projection in a surface direction which is interposed between at least any one of both of the arm portions of said T-shaped connection member and a head portion of said bolt, wherein the projection of said second lock washer is brought into contact with the leg portion of said T-shaped connection member when said second lock washer rotates.

13. A tie rod mounting structure in a center take-off power steering apparatus according to claim 7, further comprising:

a seal member which is interposed between the arm portion of said T-shaped connection member and the head portion of said bolt, wherein said second lock washer is interposed between said seal member and the head portion of said bolt.

14. A tie rod mounting structure in a center take-off power steering apparatus according to claim 8, further comprising:

a seal member which is interposed between the arm portion of said T-shaped connection member and the head portion of said bolt, wherein said second lock washer is interposed between said seal member and the head portion of said bolt.

15. A tie rod mounting structure in a center take-off power steering apparatus according to claim 9, further comprising:

wherein a seal member which is interposed between the arm portion of said T-shaped connection member and the head portion of said bolt, and wherein said second lock washer is interposed between said seal member and the head portion of said bolt.

16. A tie rod mounting structure in a center take-off power steering apparatus according to claim 10, further comprising:

a seal member which is interposed between the arm portion of said T-shaped connection member and the head portion of said bolt, wherein said second lock washer is interposed between said seal member and the head portion of said bolt.

17. A tie rod mounting structure in a center take-off power steering apparatus according to claim 11, further comprising:

a seal member which is interposed between the arm portion of said T-shaped connection member and the head portion of said bolt, wherein said second lock washer is interposed between said seal member and the head portion of said bolt.

18. A tie rod mounting structure in a center take-off power steering apparatus according to claim 12, further comprising:

a seal member which is interposed between the arm portion of said T-shaped connection member and the head portion of said bolt, wherein said second lock washer is interposed between said seal member and the head portion of said bolt.

19. A tie rod mounting structure in a center take-off power steering apparatus according to claim 2, wherein a stepped recess portion to which both of the arm portions of said T-shaped connection member are fitted, and an annular protruding wall which surrounds one end portion of said collar and is brought into contact with the arm portion of said T-shaped connection member, are respectively formed in said dust boot.

20. A tie rod mounting structure in a center take-off power steering apparatus according to claim 2, wherein a seal member is interposed between said dust boot and the arm portion of said T-shaped connection member.

* * * * *